Feb. 2, 1965 R. W. SANDERS 3,168,722
ELECTRONIC COMMUTATOR WITH REDUNDANT COUNTING ELEMENTS
Filed March 21, 1961

INVENTOR.
RAY W. SANDERS
BY Allen E. Botney
ATTORNEY 3,168,722
Patented Feb. 2, 1965

1

3,168,722

ELECTRONIC COMMUTATOR WITH REDUNDANT COUNTING ELEMENTS

Ray W. Sanders, Los Angeles, Calif., assignor to Space-General Corporation, Glendale, Calif.

Filed Mar. 21, 1961, Ser. No. 97,283
6 Claims. (Cl. 340—172)

Figure 1:
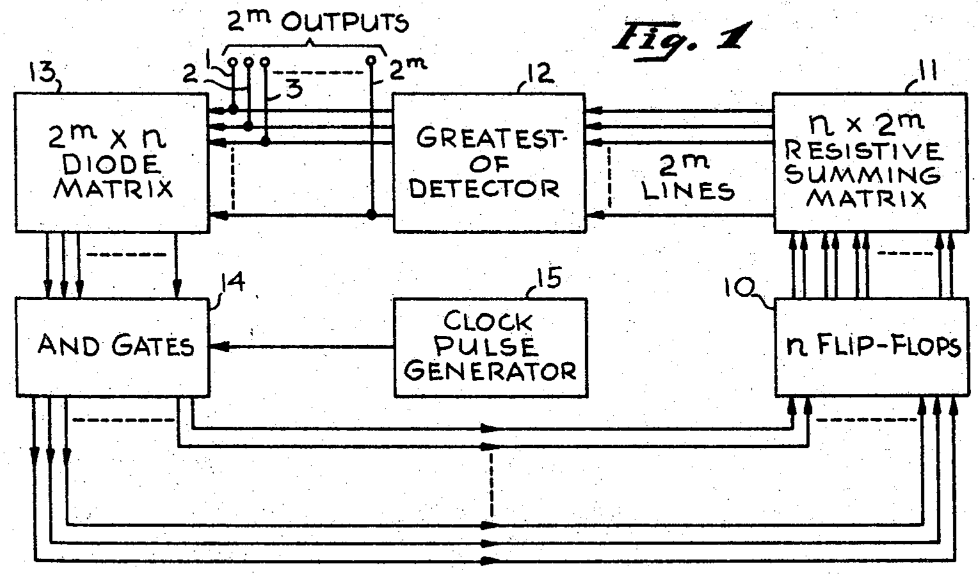

The present invention relates in general to electronic switching systems and, more particularly, to circuits for increasing the reliability of such switching systems.

Electronic counters, which may be either of the ring or binary chain type, are used extensively as distributors or pulse commutators in electronic switching systems. In some time division multiplex system applications, an electronic counter is continuously stepped under control of master oscillator and the output signals appearing on the output conductors individually corresponding to the settings of the counter are used to define individual time positions which recur in repetitive time position frames. In other applications, an electronic counter is used to control the assignment of individual circuits, such as calling line finders or registers in electronic switching telephone systems, for use in turn by the application of mark signals to conductors individual to those circuits. Regardless of the application, there is usually only one electronic counter provided to perform a particular function in an electronic switching system and if that counter should fail, the result would obviously be catastrophic. As a result, standby equipment is oftentimes utilized and when service is interrupted the standby equipment is either manually or automatically substituted for the apparatus that has failed.

It will be immediately recognized that such a technique has several disadvantages associated with it. First, the use of a standby system requires a complete duplication of equipment which is costly per se and, then again, is inefficient since the standby equipment is not in use most of the time. Second, the use of standby equipment does not prevent failure or interruption of service but; rather, merely reduces the duration of any such interruption. Furthermore, none of these prior art systems are capable of switching standby equipment into use without interferring with connections being established or connections already established. It can only be concluded, therefore, that a segment of information is unavoidably lost when a failure occurs and the switching operation is interrupted in these earlier systems.

It is, therefore, an object of the present invention to provide a highly reliable switching system.

It is another object of the present invention to provide a switching system wherein a failure of one of the elements in the digital counter therein will not produce an interruption in the system operation.

It is a further object of the present invention to provide a switching system that may be adapted or arranged so that a failure of one or more stages in the counter will not result in disabling of the circuit.

The present invention attains these objectives and thereby substantially eliminates many of the disadvantages encountered among prior art systems by making use of a redundant number of counter stages in conjunction with a suitable coding and decoding scheme. In accordance with the basic concept of the present invention, the counter is caused to successively generate different pulse codes, with each pulse code corresponding to a different step in the overall switching operation. Identification is then made of the different codes thusly generated, recognition pulses that initiate the switching steps respectively being generated in response to these code identifications. The essence of the invention lies in the fact that the coding and decoding scheme is so arranged that identification of a pulse code is made notwithstanding the fact that one or more of the pulses in that code is missing.

2

More particularly, in one embodiment of the invention $n$ flip-flops or other bi-stable elements are connected to an $n$ by $2^m$ resistive summing matrix of the matched-filter type, where $n$ equals $m+k$ and $m$ is the number of "message bits" and $k$ is the number of of "check bits" in a binary error correcting code. The summing matrix output is connected to a "greatest-of" detector which selects the line out of the matrix having the largest signal output. As a result, only one of $2^m$ lines is energized at the detector output. The energized line then selects an $n$-bit code by means of a $2^m \times n$ diode matrix, the particular code selected corresponding to the code set into the resistive summing matrix on the line that is next lower to the one which was previously energized. On command of a clock or other pulse source output, the $n$-bit code appearing at the output of the diode matrix is transferred to the flip-flops. This, therefore, ultimately results in a new line being energized at the "greatest-of" detector output, the cycle just described being repeated until all the detector output lines have been energized in succession.

The system makes use of a number of redundant flip-flop elements, with the result that a failure of one or more of these elements will not disable the system. More specifically, a greater number of flip-flop elements are used in the counter than are actually required for ultimately energizing the different detector output lines. By so doing, it becomes possible to arrange the pulse out of the counter to be sufficiently different from each other so that they will remain recognizably different from each other notwithstanding the fact that a flip-flop element has become disabled and therefore cannot contribute its pulse to the pulse groups out of the counter. The detector outputs will therefore continue to be energized without interruption notwithstanding the fact that a failure has occurred.

An obvious advantage of a system according to the present invention is that it avoids the need for standby equipment which is inherently inefficient in that it requires a complete duplication of everything in use although the additional apparatus is used only a fraction of the time. Furthermore, whereas the technique of using standby equipment results in an interruption in system operation at such time as a failure occurs, the system of the present invention obviates this defect for the reasons explained above and, in addition, permits equipment changes to be made to correct for failures while the system is in operation.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 2:
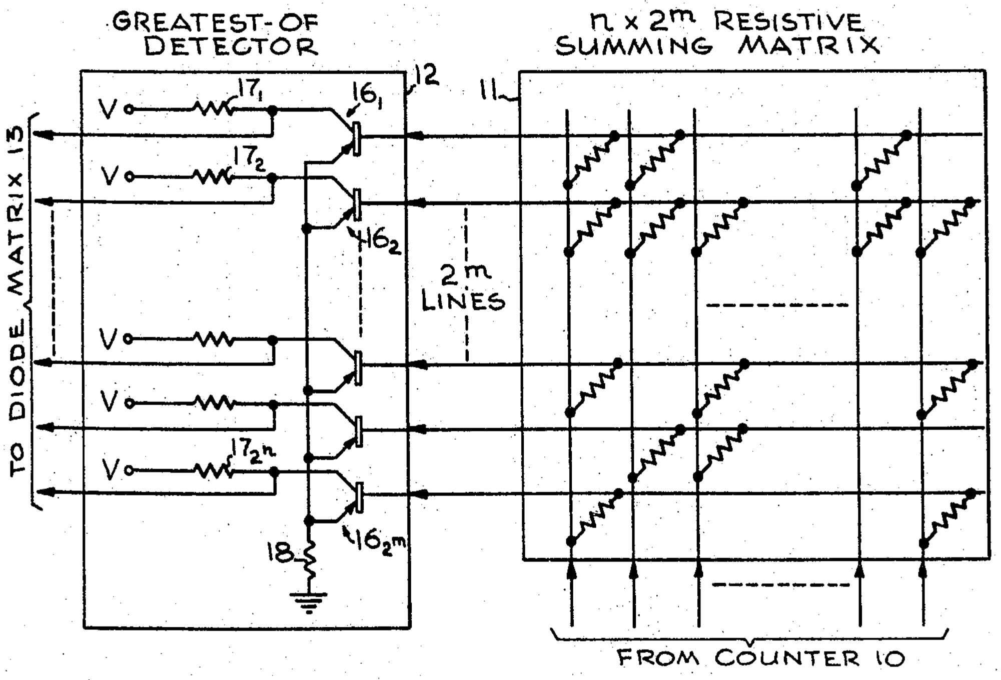

FIGURE 1 is a block diagram generally illustrating one embodiment of the present invention; and FIGURE 2 is a schematic representation of the constructional features of two units in the embodiment of FIG. 1.

Referring now to the drawings and in particular to FIG. 1 therein, the embodiment is shown to basically include a counter 10 having *n* flip-flop circuits, the flip-flops respectively being coupled at their output ends to the *n* input lines of a resistive summing matrix 11. Matrix 11 has $2^m$ output lines, the matrix being connected by means of these $2^m$ lines to a "greatest-of" detector 12. More specifically, *m* is the least number of flip-flop elements required for the purpose of successively and individually energizing $2^m$ lines. The $2^m$ output lines and the *n* input lines of summing matrix 11 are intercoupled by means of resistors that are connected between the two sets of lines at selected points of intersection, the points of intersection being chosen in such a manner that $2^m$ different connection patterns are formed that respectively correspond to the $2^m$ difference pulse combinations out of counter 10. Stated differently, the resistors interconnect the two sets of lines in such a manner that a maximum signal will appear on a matrix output line when maximum correlation exists between an input code or pulse group and the group of resistors interconnecting that output line with the input lines of the matrix. Less than maximum signals will appear on the other matrix output lines. As for "greatest-of" detector 12, suffice it to say that the function of this detector is to simultaneously compare all $2^m$ outputs from matrix 11 and thereafter to determine which of the outputs is the greatest. Further specific details regarding matrix 11 and detector 12 will be presented below.

The FIGURE 1 embodiment further includes a diode matrix 13 connected between "greatest-of" detector 12 and an array of *n* AND gates 14, connection between the diode matrix and the "greatest-of" detector being made via the detector's $2^m$ output lines whereas connection between the diode matrix and the AND gates is made by means of *n* output lines from the matrix. Also connected to each and every AND gate is a clock pulse generator 15 and, finally, the *n* AND gates are respectively connected to the *n* flip-flops of counter 10 at the input ends thereof. The output lines for the system as a whole are the same as the lines out of detector 12 and are designated 1, 2, . . . $2^m$, as shown in the figure.

Diode matrix 13 is of the type that produces an output combination of pulses whose arrangement is determined by the particular input line energized. In the present instance, the matrix is capable of producing any one of $2^m$ different pulse combinations or codes for application to AND gates 14, the particular combination produced depending upon which of the lines interconnecting the diode matrix and the "greatest-of" detector is energized by the detector. Diode matrices of this sort are well known in the electronic arts at this time such as, for example, in the data processing field, the telemetry field, etc. Accordingly, it is not deemed necessary to describe the diode matrix in any greater detail.

Resistive summing matrix 11 and "greatest-of" detector 12, as they may be embodied, are shown in greater particularity in FIG. 2. With respect to the summing matrix, the arrangements of the resistors so as to form different interconnecting patterns that respectively correspond to the different pulse combinations out of counter 10 is clearly shown and is self-explanatory in nature. However, further information relative to the summing matrix may be obtained by referring to Italian Patent 494,938, granted June 7, 1954, which shows and describes a resistor matrix that may be adapted for use herein. As for "greatest-of" detector 12, it includes a plurality of transistors, namely, one for each of the $2^m$ lines out of the summing matrix. Accordingly, there are $2^m$ transistors in the detector, the transistors being generally designated $16_1$–$16_{2^m}$. The base elements of these $2^m$ transistors are respectively connected to the output lines of matrix 11. The collector elements of these transistors, on the other hand, are respectively connected through resistors $17_1$–$17_{2^m}$ to a source of voltage designated V. As for the emitter elements, these are all electrically tied to a common bus connected to ground. Finally, considering the output connections of the "greatest-of" detector, there are $2^m$ output lines, one such line from the collector element of each transistor. The $2^m$ lines out of detector 12 lead to diode matrix 13 and, as previously mentioned, also constitute the output lines for the entire system.

In considering the operation, it will initially be assumed that line 1 out of "greatest-of" detector 12 is energized. Accordingly, a pulse is applied via this line to diode matrix 13 which, in response thereto, develops and produces a predetermined pulse code or pulse combination which it applies to AND gates 14. At this time, therefore, pulses are applied to preselected ones of AND gates 14. At this same moment, a clock pulse generated by clock pulse generator 15 is fed to each and every one of the AND gates, with the result that those gates to which the pulses out of matrix 13 have been applied now pass these pulses to the lines interconnecting the AND gates and flip-flops 10. The affected flip-flops then apply a corresponding pulse-coded arrangement to resistive summing matrix 11, each resistor pattern in the matrix summing and averaging the several pulses applied to it to produce a single pulse on the associated output line whose amplitude is proportional to the total number of pulses received by the resistors of that pattern.

Accordingly, in response to the signals out of flip-flops 10, matrix 11 respectively produces $2^m$ voltage pulses of varying amplitude on its $2^m$ output lines, the pulse of maximum amplitude being produced by the resistor pattern that is in greatest correlation with the arrangement or pattern of pulses produced by the flip-flops. "Greatest-of" detector 12 simultaneously compares all the voltage outputs from matrix 11 and thereafter determines which of the outputs has the greatest amplitude. Which one of output lines 1–$2^m$ is next energized is dependent upon this determination, that is, is dependent upon which of the output lines from summing matrix 11 has the signal of greatest amplitude thereon. It will immediately be recognized that the pulse code produced by diode matrix 13 in response to the energization of line 1 is one that will ultimately cause the energization of line 2. Consequently, following the application of the $2^m$ pulses to "greatest-of" detector 12, output line 2 is energized by the detector.

The basic cycle of operation described above is now repeated once again in that the energizing signal on line 2 causes diode matrix 13 to apply another predetermined arrangement of pulses to AND gates 14 which then pass this group of pulses to flip-flops 10 upon occurrence of a clock pulse from generator 15. Flip-flops 10 now produce a different set of pulses which has the basic effect of rearranging the distribution of the pulses out of summing matrix 11. Stating it more succinctly, the pulse of maximum amplitude applied to "greatest-of" detector 12 will now appear on the third bus line thereof rather than the second line as before, with the result that output line 3 will be energized by the detector when it has made its "greatest-of" determination. These cycles are repetitive with diode matrix 13 producing a different predetermined pulse code arrangement during each new cycle, thereby leading to the energization of the remaining output lines of the system. Of course, following the energization of the last output line, namely, output line $2^m$, output line 1 is next energized.

It would appear to be worthwhile at this point to more specifically delineate the operation of "greatest-of" detector 12 as it is shown in detail in FIGURE 2. Accordingly, the $2^m$ different output voltages developed by summing matrix 11 are respectively applied to transistors $16_1$–$16_{2m}$, more particularly, to the base elements thereof. The action of the transistors is such that current will ultimately flow through resistor 18 from only one of these transistors, namely, the one with the greatest input voltage. All other transistors are back-biased by the voltage drop across resistor 18. It is thus seen that only one of the transistors becomes forward-biased and that is the one to which the pulse of greatest amplitude is applied, with the result that only one resistor of resistors $17_1$–$17_{2m}$ will experience a voltage drop across it, namely, that resistor which is in the circuit of the transistor that is forward-biased by the pulse of greatest amplitude. Consequently, only the associated output line of lines 1–$2^m$ will thereby be energized. Upon redistribution of the pulses out of summing matrix 11, the next succeeding transistor will become forward-biased and, correspondingly, the next succeeding output line will become energized.

Although only one arrangement of the invention has been illustrated above by way of example, it is not intended that the invention be limited thereto. Accordingly, the invention should be considered to include any and all modifications, alterations or equivalent arrangemetns falling within the scope of the annexed claims. In short, variations are possible. For example, by suitable flip-flop design, the function of the "greatest-of" detector and the diode matrix could be replaced by a second resistive matrix. Thus, if the number of flip-flops were large and if the flip-flop switching current threshold were adjusted properly, proper circuit operation would result.

Having thus described the invention, what is claimed as new is:

1. An electronic commutator comprising:
a number of output terminals to be sequentially energized;
a coding matrix connected to the output terminals to be energized simultaneously with the energization of any of the output terminals;
said coding matrix including a plurality of diodes associated with each of the output terminals of the commutator to generate a different code on a number of parallel matrix output conductors for each output terminal of the commutator;
the number of parallel output conductors and code positions of the matrix being greater than the minimum number required to produce a different code for each commutator output terminal;
a second matrix for resistively summing the output of the parallel output conductors of the coding matrix;
the second matrix including a plurality of resistors cross-connecting between selected parallel conductors from the first matrix and a number of output lines from the second matrix equal to the number of output terminals of the commutator;
the resistors in said second matrix cross-connected to produce a maximum summed signal level on a different one of the output conductors for each different code;
and means connected between said second matrix and the commutator output terminal for comparing the summed signal levels on each of the lines from the second matrix;
said last means operative to energize one only of the commutator output terminals and one coding matrix line corresponding to the maximum summed signal from said second matrix.

2. An electronic commutator comprising:
a plurality $2^m$ output terminals to be energized in a predetermined order where $m$ denotes an integer equal to the minimum number of binary counter elements or bits capable of producing a different binary code for each of $2^m$ output terminals:
a diode matrix connected to said output terminals to generate a differnt $n$ bit binary code upon the energization of said output terminals of the commutator;
a number $n$ of binary counting elements where $n$ is an integer greater than $m$;
a resistive matrix having $n$ input and $2^m$ output connections and a plurality of resistance cross-connections there between so as to produce a maximum summed signal level on different of each of the $2^m$ output lines for different code combinations appearing in the input of the resistive matrix;
gate means for applying the coded output of the said diode matrix to said resistive matrix;
and means connected between the $2^m$ output connections of said resistive matrix and the $2^m$ output lines of the commutator for sensing the maximum summed signal from the resistive matrix and passing the maximum summed signal only to its resistive commutator output terminal and the diode matrix.

3. The combination in accordance with claim 2 wherein the excess of $n-m$ counting elements are selectively connected to resistive elements in the resistive matrix to the output connections thereof similar to the $m$ counting elements whereby the summed signal on each of the $2^m$ output connections of the resistive matrix is a function of the condition of each of the $n$ counting elements and a failure of one or more of the counting elements to operate only reduces the maximum levels of summed signals and probability of detection without rendering undetectable the code combination at the counting element input.

4. The combination in accordance with claim 2 wherein said commutator includes a clock pulse generator connected to said gate means for periodically enabling said gate and thereby establishing the time rate of commutation.

5. An electronic commutator for sequentially energizing $2_m$ output terminals wherein $m$ is an integer equal to the least number of binary coding elements and bits capable of providing a different code for each of $2_m$ output lines comprising:
a code matrix connected to each of the $2^m$ output terminals for generating $2^m$ different $n$ bit codes wherein $n$ is a number greater than $m$;
$n$ binary counting elements respectively connected to the coding matrix and controlled thereby in response to codes developed in the coding matrix;
a second matrix for summing the output of the $n$ binary counting elements on $2^m$ lines one for each of the commutators terminals;
means for comparing the level of the summed output of the binary counting elements on each of the $2^m$ lines;
and means for passing the maximum summed signal only to its associated commutator output terminal and to the coding matrix whereby the output terminal energized is determined by the greatest correlation between the condition of the $n$ counting elements and the predetermined configuration of the summing matrix for each of the $2^m$ output lines.

6. An electronic commutator for sequentially energizing $2^m$ number of output terminals wherein $m$ is an integer equal to the least number of binary coded elements and bits capable of providing a different code for each of $2^m$ output lines comprising:
a diode matrix with input lines connected to the commutator output terminals to be simultaneously energized with any of the output terminals;
said diode matrix having $n$ parallel output connections for generating an $n$ bit pulse code upon the energization of each commutator output terminal, wherein $n$ is an integer equal to the sum of the coding bits $m$ and an integer $k$ equal to the number or check or additional bits in the code;

a resistive matrix including $n$ input lines and $2^m$ output lines and a number of resistive cross-connections there between for producing a different maximum sum on each of the $2^m$ output lines for a different $n$ bit code at the input thereof;

and means connecting said $2^m$ lines from resistive matrix and said $2^m$ output terminals of the commutator for passing only the maximum summed signal from the resistive matrix to its associated $2^m$ output terminal and the diode matrix.

References Cited by the Examiner

UNITED STATES PATENTS

| | | | |
|---|---|---|---|
| 2,715,678 | 8/55 | Barney | 340—172 XR |
| 2,725,549 | 11/55 | Dunnet | 340—172 |
| 2,871,289 | 1/59 | Cox et al. | 340—347 XR |
| 2,910,240 | 10/59 | Havens | 340—347 XR |
| 2,966,672 | 12/60 | Horn | 340—149 XR |
| 2,994,076 | 7/61 | Havens | 340—347 |
| 2,997,541 | 8/61 | Grottrup | 340—347 XR |
| 3,050,713 | 8/62 | Harmon | 340—172 |

NEIL C. READ, *Primary Examiner.*

STEPHEN W. CAPELLI, *Examiner.*